Figure 1:
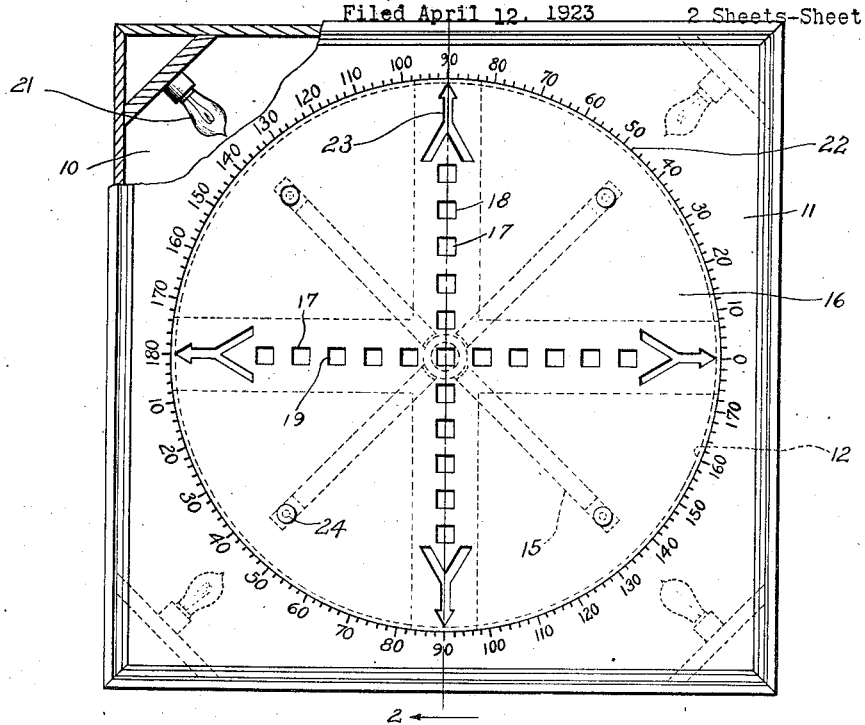
Figure 2:
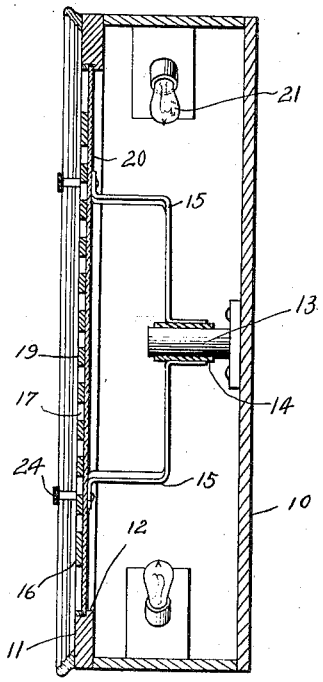
Figure 3:
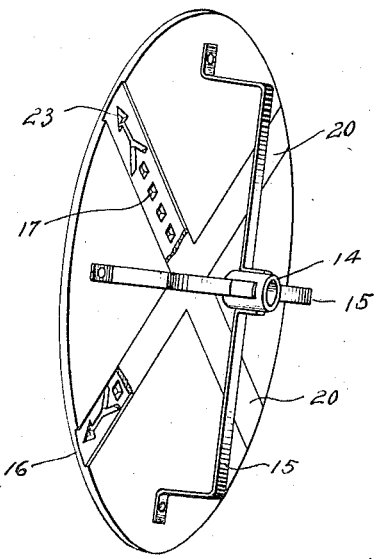
Figure 4:
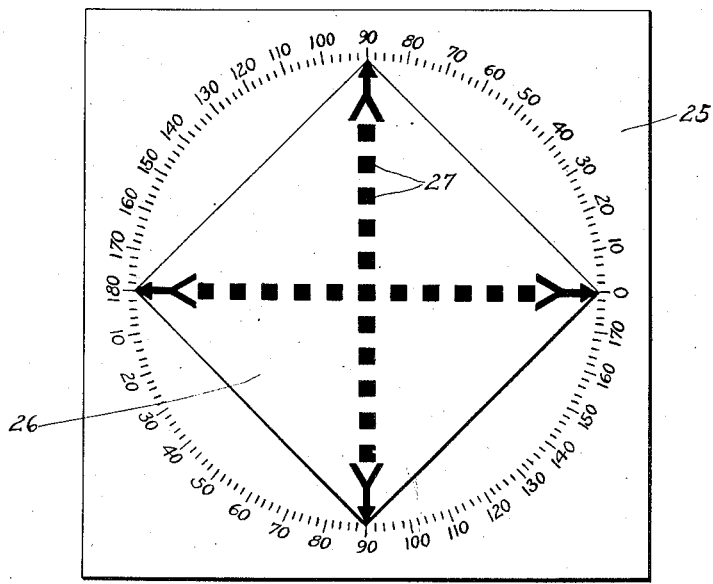
Figure 5:
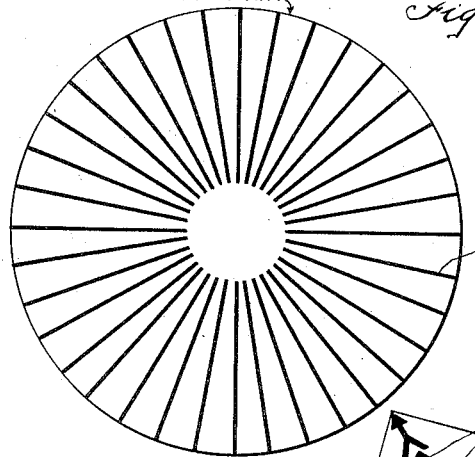
Figure 7:
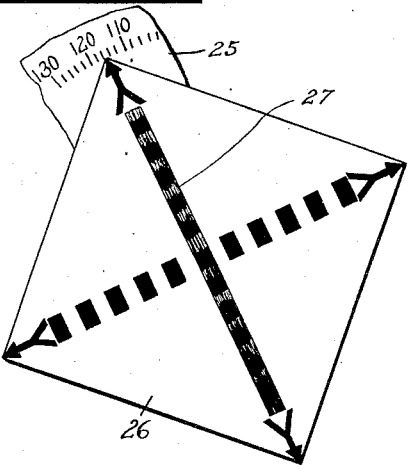
Figure 6:
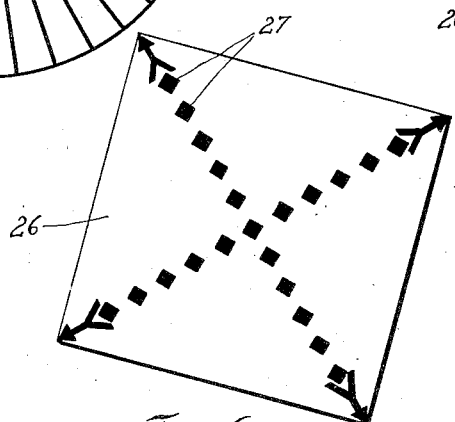

Dec. 8, 1925.  1,564,495

C. SHEARD

ASTIGMATIC TESTING DEVICE

Filed April 12, 1923  2 Sheets-Sheet 1

INVENTOR
CHARLES SHEARD
BY
Harry H. Styll
ATTORNEY

Dec. 8, 1925.  
C. SHEARD  
1,564,495  
ASTIGMATIC TESTING DEVICE  
Filed April 12, 1923  
2 Sheets-Sheet 2

INVENTOR  
CHARLES SHEARD  
BY  
Harry H. Styll  
ATTORNEY

Patented Dec. 8, 1925.

1,564,495

UNITED STATES PATENT OFFICE.

CHARLES SHEARD, OF STURBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

ASTIGMATIC TESTING DEVICE.

Application filed April 12, 1923. Serial No. 631,523.

*To all whom it may concern:*

Be it known that I, CHARLES SHEARD, a citizen of the United States, residing at Sturbridge, in the county of Worcester and State of Massachusetts, have invented certain new and useful Improvements in Astigmatic Testing Devices, of which the following is a specification.

This invention relates to improvements in astigmatic testing devices.

One object of the present invention is to produce an astigmatic testing dial from which the angle of astigmatism may be read.

Another object is to produce an astigmatic testing dial which will test the visual acuity on two meridians disposed at right angles to one another.

A further object is to produce such a device of great sensitivity.

Other objects and advantages will be apparent from the following description taken in connection with the accompanying drawings forming a part of this specification.

In the drawings:

Figure I is a front elevation of a device embodying the invention, parts being broken away.

Figure II is a vertical transverse sectional view on the line II—II of Figure I.

Figure III is a detail perspective view of the rotatable plate.

Figure IV is an elevation of a modified form.

Figure V is a diagrammatic representation of the testing charts in use at the present time.

Figure VI is a view illustrating the appearance of the rotatable plate when the principal axes of astigmatism have been approximately found.

Figure VII is a similar view when the correct meridians have been found.

Similar reference characters designate corresponding parts throughout the several views.

My device comprises essentially a cabinet or casing 10 having a front 11, which is provided with a central circular opening 12. Secured to the back of the casing 10, and in central alignment with the opening 12 is a stub shaft 13, upon which is loosely mounted for rotation a bushing 14 carrying the bent arms 15, to the ends of which is secured a plate 16. The plate 16 may be circular, as illustrated in Figure I, and is slightly larger than the opening 12 in the front of the casing. The plate is provided with apertures 17, said apertures being disposed in two perpendicular meridians 18 and 19. On the rear side of the plate covering the apertures 17, I provide a diffusing material 20, such as ground glass or tissue paper, and in the interior of the casing I provide suitable means for illumination, such as illustrated at 21.

Surrounding the opening 12 is a suitably graduated dial having angular indicia 22, with which register indicating arrows 23 upon the rotatable plate 16, said arrows being in central alignment with the lines of apertures 18 and 19. The connection between the bent arms 15 and the plate 16 may be by rivets, welding, or any other manner, but I prefer to have it riveted, the rivet on the outer side of the plate forming a thumb piece 24 which is convenient for rotating the plate. The front side of the plate 16 is preferably painted jet black in order that the illuminated apertures 17 will properly contrast therewith.

The device may be modified as shown in Figure IV, wherein I have provided a dial 25 of any suitable sheet material, on which is rotatably mounted the plate 26 having painted thereon a series of geometrical figures 27 herein shown as squares. In this construction the plate 26 and the dial 25 may be white and the squares 27 may be black, but I do not limit myself to black and white exclusively. If desired the plate 26 may be light pink or other color, and the squares 27 of a suitable color to contrast with the background.

In both forms of the invention the squares 17 and 27 should be of equal size and the distance between the squares should be equal to the width of the squares. Squares are of such a size that they subtend an angle of one minute to a minute and a half for the distance at which the test is made. A series of rotatable plates may be furnished with each dial, each plate in the series having different sizes of squares for use in testing at various distances.

My device is preferably used in connection with the fogging system, which is well known to all refractionists. Under this system the patient is made artificially myopic by placing before the eye lenses of sufficient positive power to produce this effect in all meridians. After the patient's vision has been fogged a dial, such as indicated in Figure V, is placed before him. This dial is provided with radiating lines 28 spaced approximately ten degrees apart, the lines contrasting with the background upon which they appear. If the condition of astigmatism exists, one of the lines 28 will appear more pronounced or clearer than all the others, the angularity of this line indicating the approximate axis of the astigmatism.

The patient is then placed before my improved dial and the plate 16, or plate 26, is revolved so that one of the lines 18, or 19, is disposed at the angle indicated by the patient in the preceding test. When the principal axes of astigmatism have thus been found the apertures 17 will appear to be skewed or rhomboidal in form. Then by slightly rotating the plate 16, one series of apertures will seem to become a continuous line, while the other series of apertures will seem to become rectangular in shape, as clearly shown in Figure VII. When this phenomenon is present the correct merdians of astigmatism have been found, after which the proper cylindrical lens may be selected which will give equality of appearance to the two lines of squares.

From the foregoing it will be evident that I have produced a new device for use in astigmatic testing, the device being extremely sensitive and a general improvement in the art. It is, of course, to be understood that I do not limit myself to the precise details illustrated in the drawings, but may make changes falling within the scope of the claims without departing from the spirit of the invention.

Having thus described my invention, what I claim is:

1. In a device of the character described, a disc having two lines of separated squares crossing each other centrally of the disc, means for pivoting the disc at its center, a circular scale surrounding the outer edges of the disc, and a pointer on the disc adapted to indicate on the scale the amount of movement of the disc about its pivot.

2. In a device of the character described, a disc having two lines of perforated separated squares crossing each other centrally of the disc, means for pivoting the disc at its center, a circular scale surrounding the outer edges of the disc, a pointer on the disc adapted to indicate on the scale the movement of the disc about its pivot, and a light behind the disc.

3. In a device of the character described, a disc having two lines of separated squares crossing each other at right angles centrally of the disc, brace members secured to the rear of the disc, a hub carried by the brace members, and a member having a pivot pin adapted to fit in the hub, whereby the disc may be rotated on the pivot.

4. In a device of the character described, a disc having two lines of separated perforations crossing each other at right angles, centrally of the disc, means to pivot the disc at its center, a light diffusing member behind the perforations, and a light behind the light diffusing member.

CHARLES SHEARD.